(12) United States Patent
Meszaros

(10) Patent No.: US 9,242,592 B1
(45) Date of Patent: Jan. 26, 2016

(54) TENSIONER MECHANISM FOR TIEDOWN ASSEMBLY

(71) Applicant: Peck & Hale, L.L.C., West Sayville, NY (US)

(72) Inventor: Lajos Meszaros, Huntington, NY (US)

(73) Assignee: PECK & HALE, L.L.C., West Sayville, NY (US)

( * ) Notice: Subject to any disclaimer, the term of this patent is extended or adjusted under 35 U.S.C. 154(b) by 205 days.

(21) Appl. No.: 14/013,699

(22) Filed: Aug. 29, 2013

Related U.S. Application Data

(60) Provisional application No. 61/694,405, filed on Aug. 29, 2012.

(51) Int. Cl.
*F16G 15/00* (2006.01)
*B60P 7/08* (2006.01)

(52) U.S. Cl.
CPC .............. *B60P 7/0853* (2013.01); *B60P 7/0823* (2013.01); *B60P 7/0838* (2013.01); *Y10T 24/2175* (2015.01); *Y10T 24/2177* (2015.01)

(58) Field of Classification Search
CPC ......... F16G 11/00; F16G 11/12; F16G 11/10; B60P 7/0838; Y10T 24/2177; Y10T 24/1418; Y10T 24/2175

See application file for complete search history.

(56) References Cited

U.S. PATENT DOCUMENTS

| | | | | | |
|---|---|---|---|---|---|
| 2,712,955 | A | * | 7/1955 | Andrews | 292/113 |
| 3,259,411 | A | * | 7/1966 | Griffiths | 292/113 |
| 3,887,966 | A | * | 6/1975 | Gley | 24/68 CD |
| 4,743,052 | A | * | 5/1988 | Stammreich et al. | 292/113 |
| 2008/0129056 | A1 | * | 6/2008 | Hernandez et al. | 292/98 |

FOREIGN PATENT DOCUMENTS

EP 2248435 A1 * 11/2010 ............. A44B 11/12

* cited by examiner

*Primary Examiner* — Robert J Sandy
(74) *Attorney, Agent, or Firm* — Schroader Law PC

(57) ABSTRACT

An improved tensioner mechanism for a tiedown assembly, the mechanism including a handle latch which automatically locks the handle to the body of the mechanism once the handle is moved to the closed/engaged position. The handle latch provides enhanced resistance to environmental conditions, and improved positive locking capability.

8 Claims, 7 Drawing Sheets

TENSIONER MECHANISM FOR TIEDOWN ASSEMBLY

BACKGROUND OF THE INVENTION

The present invention relates to the transportation of cargo and, more particularly, to an improved tensioner mechanism for a tiedown assembly.

The transportation of cargo requires securing systems and devices that ensure that such cargo remains safely stowed and stationary during transit. Tiedown assemblies are used to secure an item of cargo to the deck of the transportation vehicle. One commonly used tiedown assembly includes: i) a chain assembly; and ii) a tensioner assembly. The chain assembly includes a length of chain having a hook at one end. The tensioner assembly includes a tensioner mechanism, a shock mitigator, and a hook. During operation, the hooks of the chain and tensioner assembly are secured to a fitting on the cargo item and to the deck of the vehicle, respectively. The chain is then passed through the tensioner mechanism. The handle of the tensioner mechanism is then closed to retain the chain in a tensioned state. The typical prior art chain assembly includes a sliding latch located about a portion of the handle. After the handle is closed, the sliding latch is then manually moved by the operator to the locked position, thereby preventing inadvertent release of the handle.

It will be recognized by those skilled in the art that the need to manually slide the existing prior art latch to the locked position following closing of the handle necessitates an additional operator step. It will also be recognized that the operational performance of a sliding latch may be affected by environmental conditions such as wear, abuse, corrosion and temperature.

There is therefore a need in the art for a tiedown assembly which facilitates usage in the field by employing a handle latch which automatically locks such handle once the handle is moved to the closed/engaged position. There is a further need in the art for a tiedown assembly having a handle latch which provides enhanced resistance to environmental conditions such as wear, abuse, corrosion and temperature, and improved "positive locking" capability.

SUMMARY OF THE INVENTION

The present invention, which addresses the needs of the prior art, provides a tensioner mechanism for a tiedown assembly. The tiedown assembly includes a section of securing chain. The tensioner mechanism includes a body having a chain-engaging end and a handle pivotally attached to the body and movable between a first open position and a second closed position. The handle includes a chain-engaging elbow for tensioning the chain within the chain-engaging end of the body when the handle is moved to the closed position. The handle further includes a latch pivotally attached thereto. The latch is pivotal between a first locked position and a second unlocked position. The latch is biased to the locked position. The latch is configured to contact the body to pivot the latch towards the unlocked position as the handle is moved from the open position to the closed position.

As a result, the present invention provides an improved tensioner mechanism which facilitates usage in the field by employing a handle latch which automatically locks such handle once the handle is moved to the closed/engaged position. The present invention further provides an improved tensioner mechanism wherein the handle latch exhibits enhanced resistance to environmental conditions such as wear, abuse, corrosion and temperature, and improved positive locking capability.

DETAILED DESCRIPTION OF THE INVENTION

Figure 1:
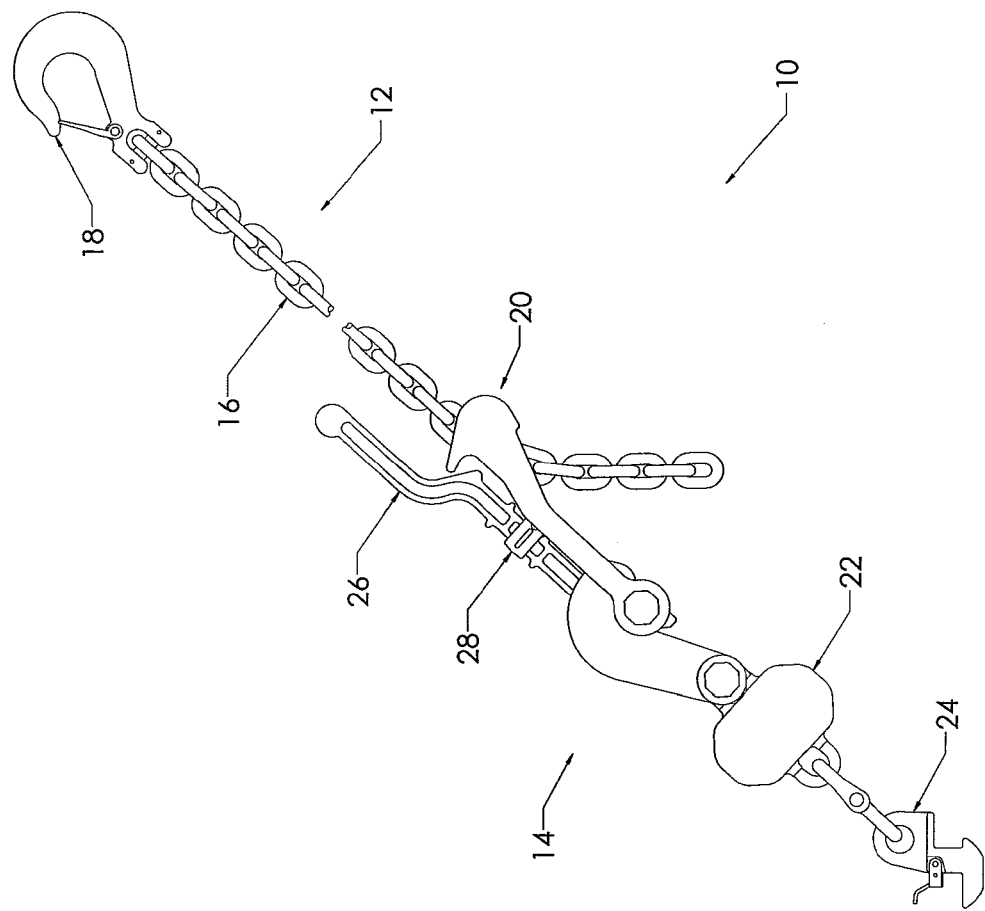
FIG. 1 is an elevation view of a prior art tiedown assembly.

A prior art tiedown assembly 10 is shown in FIG. 1. Tiedown assembly 10 includes a chain assembly 12 and a tensioner assembly 14. In turn, chain assembly 12 includes a chain 16 and a hook 18. Tensioner assembly 14 includes a tensioner mechanism 20, a shock mitigator 22, a hook 24, a handle 26 and a latch 28. Hook 18 is secured to a fitting located on a cargo item, while hook 24 is secured to the deck of the vehicle. A length of chain 16 is passed through tensioner mechanism 20 while handle 26 is in the open/disengaged position. (Handle 26 is shown in the closed/engaged position in FIG. 1). Once handle 26 is closed, latch 28 is manually slid by the operator from the unlocked position to the locked position.

Figure 2:
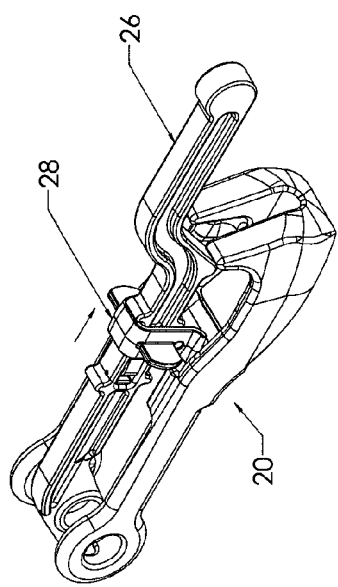
FIGS. 2 to 5 are perspective views of the prior art tensioner mechanism shown in FIG. 1.
Figure 3:
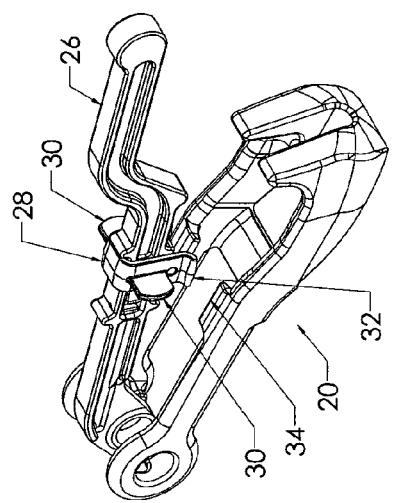
Figure 4:
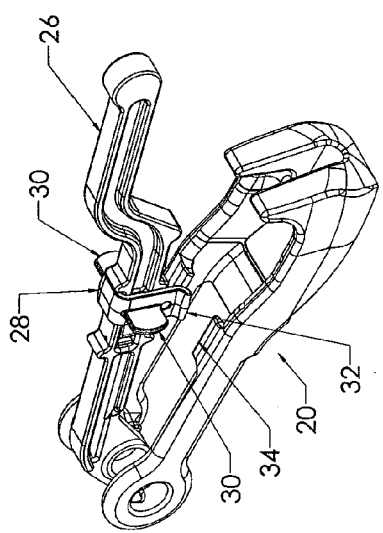
Figure 5:
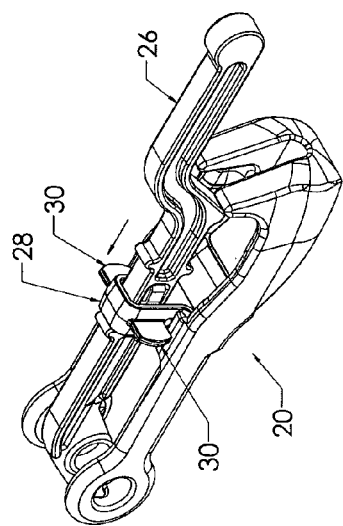

Prior art tensioning mechanism 20 is shown in greater detail in FIGS. 2 to 5. In FIG. 2, latch 28 is shown in the unlocked position, while handle 26 is shown in the closed/engaged position. In FIGS. 3 and 4, handle 26 is shown in the open/disengaged position. In FIG. 5, handle 26 is shown in the closed/engaged position, and latch 28 is shown in the locked position. In this regard, latch 28 includes a pair of opposing wing-shaped arms 30, against which pressure may be applied to slide the latch along the handle between the locked and unlocked positions. The latch further includes a pair of opposing shoulders 32, which engage the underside of opposing tabs 34 formed on the body of the tensioner mechanism.

Figure 6:
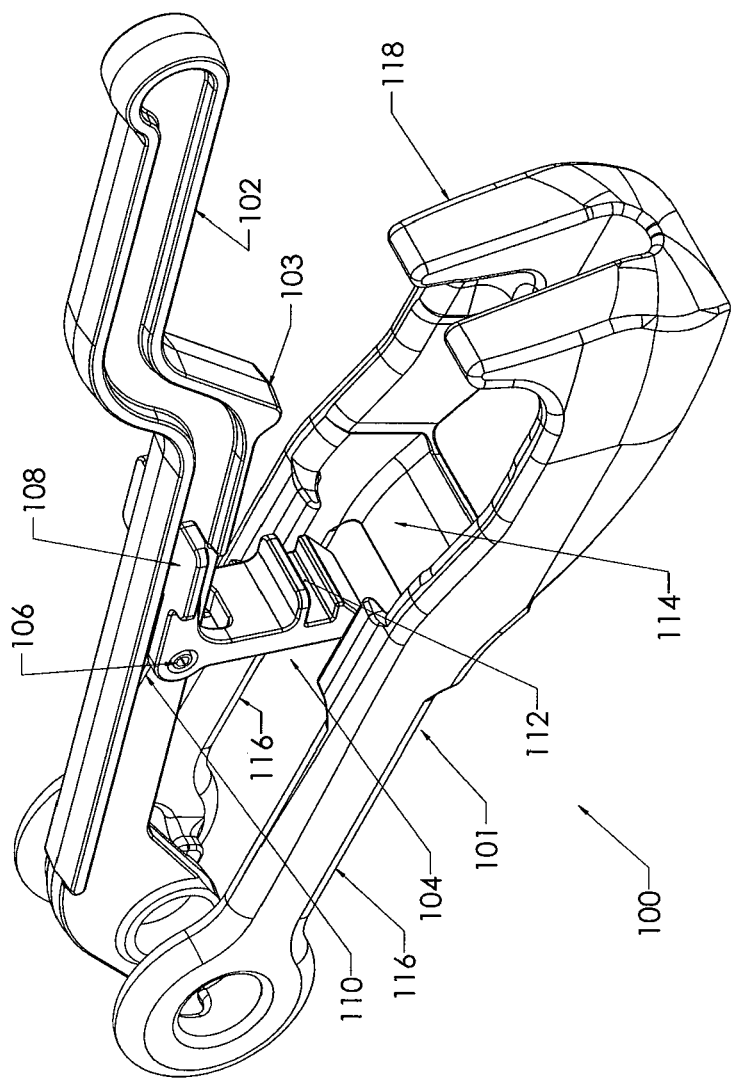
FIG. 6 is a perspective view of the tensioner mechanism of the present invention.

Turning now to FIG. 6, an improved tensioner mechanism 100 formed in accordance with the present invention is shown. Tensioner mechanism 100 is designed and configured to replace tensioner mechanism 20 of tiedown assembly 10 discussed hereinabove. In this regard, tensioner mechanism 100 is designed to receive and tension a length of chain, and includes a body 101 and a handle 102. Handle 102 includes a chain-engaging elbow 103. Handle 102 is shown in the open/disengaged position in FIG. 6.

Tensioner mechanism 100 incorporates a novel handle latch design, which includes a latch 104. Latch 104 is pivotally connected to handle 102. This pivotal connection may be accomplished via a pin 106, or other comparable structure. Latch 104 includes a pair of opposing release tabs 108, which when pressed by the operator rotate latch 104 about pin 106. A spring 110 biases latch 104 to the locked position. Spring 104 is preferably symmetrical in design and configured to engage both sides of the handle. Latch 104 further includes an engagement slot 112 sized and located to engage cross-member 114 when handle 102 is moved to the closed/engaged position. As shown, cross-member 114 extends between opposing legs 116 of body 101. Body 101 includes a chain-engaging end 118.

Figure 7:
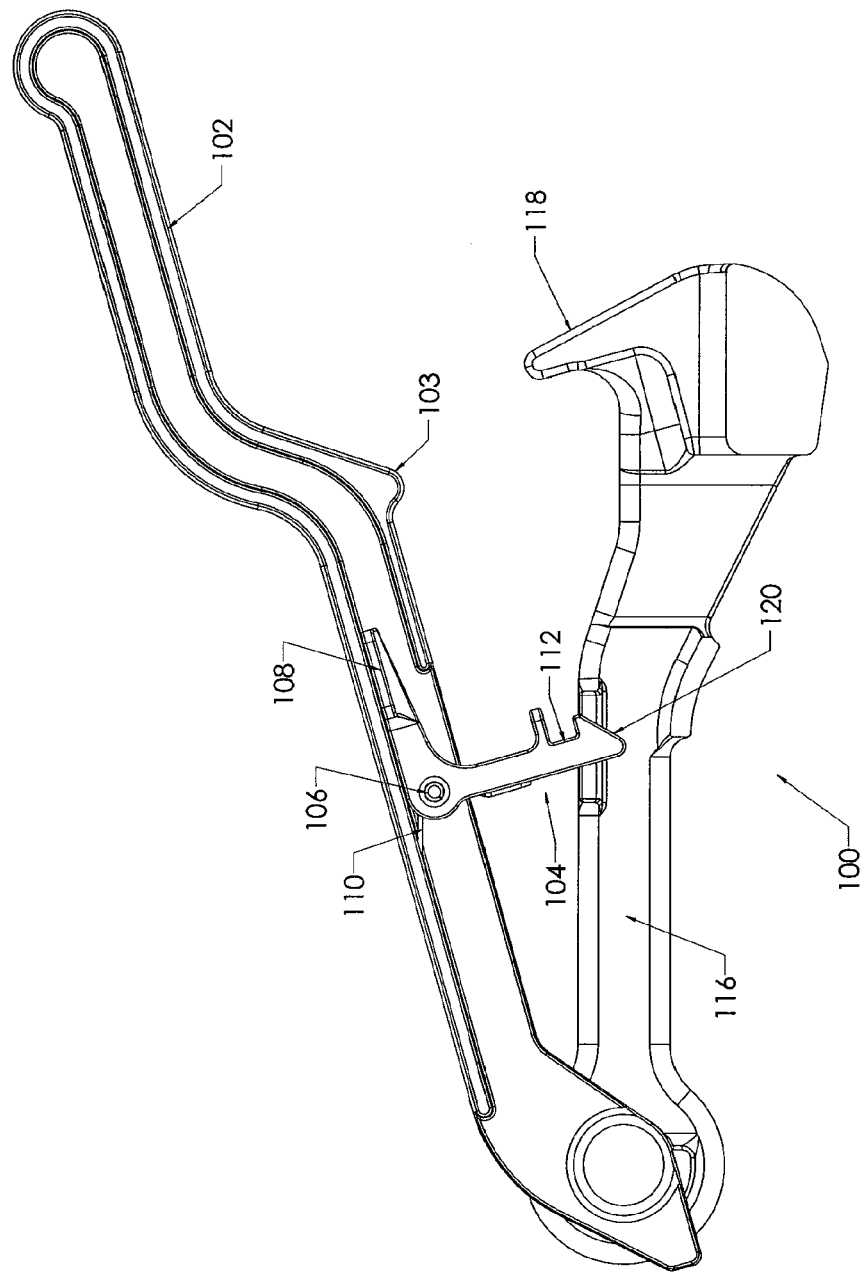
FIGS. 7 to 9 are side elevation views of the tensioner mechanism of FIG. 6 wherein one leg of the body has been removed for clarity.
Figure 8:
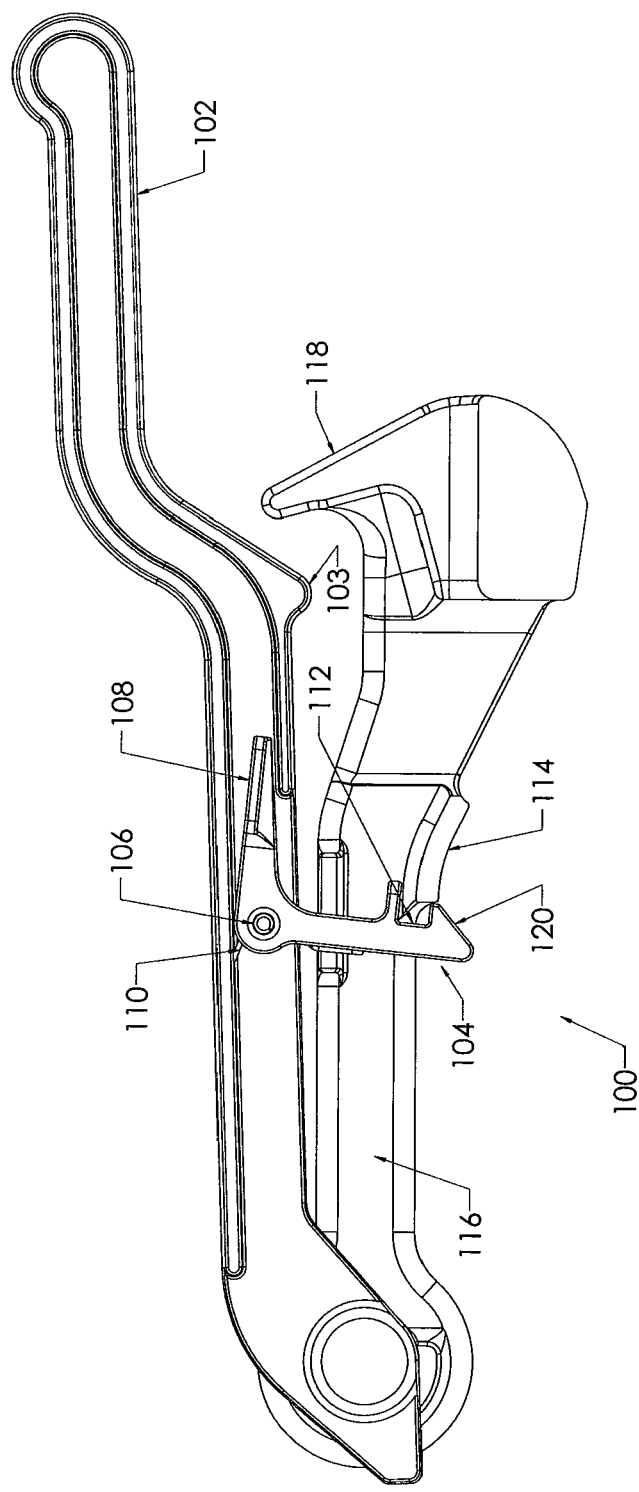
Figure 9:
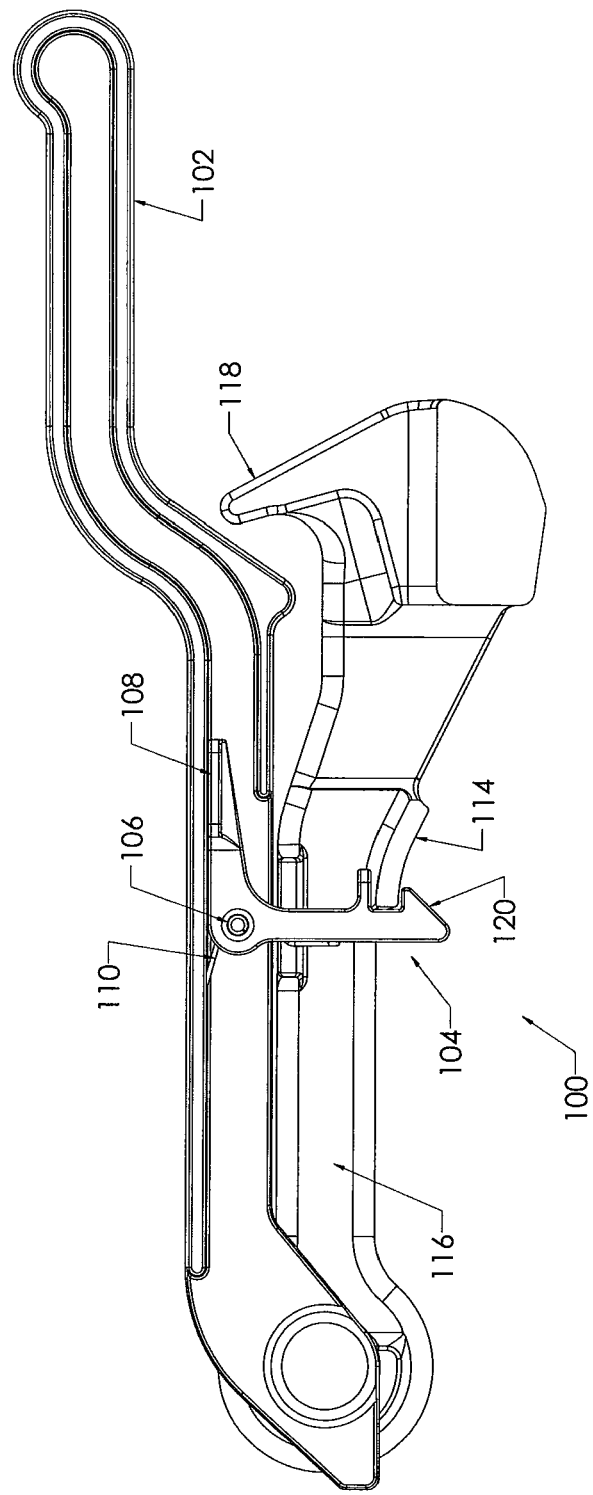

The operation of tensioning mechanism 100 is best understood by reference to FIGS. 7 to 9. Turning first to FIG. 7, handle 102 is shown in the open/disengaged position. Latch 104 remains in the locked position due to the biasing force imparted thereon by spring 110. As handle 102 is moved to the closed/engaged position (see FIG. 8), ramped edge 120 engages cross-member 114, thereby causing latch 104 to pivot clockwise about pin 106 against the bias of spring 110. As handle 102 is moved further towards the closed and engaged position (see FIG. 9), ramped edge 120 moves past cross-member 114, which allows latch 104 to rotate counter-clockwise about pin 106 thereby allowing cross-member 114 to engage slot 112.

As a result, the closing of handle 102 results in both the tensioning of the chain and the locking of the latch. The novel design of the present invention eliminates the additional step of manually sliding the latch of the prior art tensioning mechanism to the locked position. To open the handle, the operator presses against release tabs 108, which will rotate latch 104 clockwise (as viewed in FIG. 7), thereby disengaging cross-member 114 from slot 112. Once disengaged, handle 102 may be moved to the open position.

Latch 104 of the present invention additionally provides improved "positive locking" between the handle and the body of the tensioning mechanism. This is best understood by comparing the engagement between shoulders 32 and tabs 34 of prior art mechanism 20 with the engagement between cross-member 114 and slot 112. It will be recognized that the shoulders and tabs of prior art mechanism 20 require a degree of clearance for sliding, and can also affected by manufacturing and assembly tolerances. In contrast, the novel design of the present invention allows for tighter tolerances of the engaging members, while at that same time providing an increased cross-sectional area of engagement. In one preferred embodiment, this provides a locking interference fit between cross-member 114 and slot 112. It has been discovered herein that a locking interference fit reduces/eliminates travel of the handle (even during slack conditions), thereby ensuring that the chain remains engaged with the tensioning mechanism. It will also be recognized that latch 104 will provide enhanced resistance to various environmental factors such as wear, abuse and temperature. As a result, the operation of tensioning mechanism 100 will provide a more consistent experience to the operator throughout the normal lifespan of the device.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A tensioner mechanism for a tiedown assembly, said tiedown assembly including a section of securing chain, comprising:
   a body including a chain-engaging end; and
   a handle pivotally attached to said body and movable between a first open position and a second closed position, said handle including a chain-engaging elbow for tensioning said chain within said chain-engaging end of said body when said handle is moved to said closed position, said handle further including a latch pivotally attached thereto, said latch being pivotal between a first locked position and a second unlocked position, said latch being biased to said locked position, said latch being configured to contact said body to pivot said latch towards said unlocked position as said handle is moved from said open position to said closed position, wherein said latch is configured to engage said body when said handle is moved to said closed position, wherein said latch includes a slot and said body includes a cross-member, and wherein said slot is sized and configured to engage said cross-member when said handle is in said closed position; and
   a spring for biasing said latch to said locked position, wherein said spring is configured to engage both sides of said handle to provide a symmetrical biasing force.

2. A tensioner mechanism for a tiedown assembly, said tiedown assembly including a section of securing chain, comprising:
   a body including a chain-engaging end; and
   a handle pivotally attached to said body and movable between a first open position and a second closed position, said handle including a chain-engaging elbow for tensioning said chain within said chain-engaging end of said body when said handle is moved to said closed position, said handle further including a latch pivotally attached thereto, said latch being pivotal between a first locked position and a second unlocked position, said latch being biased to said locked position, said latch being configured to contact said body to pivot said latch towards said unlocked position as said handle is moved from said open position to said closed position, wherein said latch is configured to engage said body when said handle is moved to said closed position, wherein said latch includes a slot and said body includes a cross-member, and wherein said slot is sized and configured to engage said cross-member when said handle is in said closed position; and
   a spring for biasing said latch to said locked position, wherein said latch includes first and second release levers for pivoting said latch between said locked and unlocked positions, said release levers being located on opposing sides of said handle; and
   a pin extending through said release levers and handle to pivotally attached said latch to said handle.

3. The mechanism according to claim 2, wherein said latch includes a ramped leading edge configured to contact said cross-member as said handle is moved from said open position to said closed position whereby said latch is pivoted towards said unlocked position.

4. The mechanism according to claim 3, wherein said slot is positioned adjacent said ramped leading edge whereby said slot is urged into engagement with said cross-member by said spring when said handle is moved into said closed position.

5. The mechanism according to claim 4, wherein said body includes opposing legs, and wherein said cross-member extends between said opposing legs.

6. The mechanism according to claim 5, wherein said slot is sized and configured to engage said cross-member to provide a positive locking interference.

7. A tensioner mechanism for a tiedown assembly, said tiedown assembly including a section of securing chain, comprising:
   a body including opposing legs and a cross-member, said cross-member extending between said opposing legs, said body having a chain-engaging end; and
   a handle pivotally attached to said body and movable between a first open position and a second closed position, said handle including a chain-engaging elbow for tensioning said chain within said chain-engaging end of said body when said handle is moved to said closed position, said handle further including a latch pivotally attached thereto, said latch being pivotal between a first locked position and a second unlocked position, said latch being biased to said locked position, said latch including a ramped leading edge configured to contact said cross-member as said handle is moved from said open position to said closed position whereby said latch is pivoted towards said unlocked position, said latch including a slot sized and configured to engage said cross-member when said handle is in said closed position, said latch including a pair of opposing release levers, said release levers being located on opposing sides of said handle;

a spring for biasing said latch to said locked position, said spring being configured to engage both sides of said handle, said slot being positioned adjacent said ramped leading edge whereby said slot is urged into engagement with said cross-member by said spring when said handle is moved into said closed position; and a pin extending through said release levers and handle to pivotally attached said latch to said handle.

8. A tensioner mechanism for a tiedown assembly, said tiedown assembly including a section of securing chain, comprising:

a body including opposing legs and a cross-member, said cross-member extending between said opposing legs, said body having a handle-receiving end and an opposing forked chain-engaging end; and a handle pivotally attached to said handle-receiving end of said body and movable between a first open position and a second closed position, said handle including a chain-engaging elbow for tensioning said chain within said chain-engaging end of said body when said handle is moved to said closed position, said handle further including a latch pivotally attached thereto, said latch being located between said handle-receiving end of said body and said forked chain-engaging end, said latch being pivotal between a first locked position and a second unlocked position, said latch being biased to said locked position, said latch including a ramped leading edge configured to contact said cross-member as said handle is moved from said open position to said closed position whereby said latch is pivoted towards said unlocked position, said latch including a slot sized and configured to engage said cross-member when said handle is in said closed position, said latch including at least one release lever; and a spring for biasing said latch to said locked position, said slot being positioned adjacent said ramped leading edge whereby said slot is urged into engagement with said cross-member by said spring when said handle is moved into said closed position.

\* \* \* \* \*